United States Patent
Yehuda et al.

(10) Patent No.: US 8,494,977 B1
(45) Date of Patent: Jul. 23, 2013

(54) IT POLICY VIOLATION VIEWS

(75) Inventors: Hanna Yehuda, Newton, MA (US);
Daniel C. Lanzi, Wilton, CT (US);
Oran Epelbaum, Tel Aviv (IL); Frank Murphy, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 1519 days.

(21) Appl. No.: 11/864,457

(22) Filed: Sep. 28, 2007

(51) Int. Cl.
*G06Q 10/00* (2006.01)

(52) U.S. Cl.
USPC ............................................ 706/11; 709/206

(58) Field of Classification Search
USPC .... 706/11; 726/1, 27; 709/223, 226; 707/100
See application file for complete search history.

(56) References Cited

U.S. PATENT DOCUMENTS

2005/0015622 A1* 1/2005 Williams et al. ............. 713/201
2005/0027723 A1* 2/2005 Jones et al. ................... 707/100

* cited by examiner

*Primary Examiner* — David R Vincent
*Assistant Examiner* — Ola Olude Afolabi
(74) *Attorney, Agent, or Firm* — Krishnendu Gupta; Gerald P. Kazanjian

(57) ABSTRACT

In a large network, it can be difficult to pinpoint and track down the causes of rule violations deviating from established policies. Conventional environment monitoring mechanisms do not categorize notifications according to those triggering rule violations, and do not identify related network entities and rules. A rule violation processor allows traversal of notifications according to rule violations, organizing the violation according to severity and recurrence, and identifies related rules and network entities which may be related to the rule violation. The resulting graphical user interface provides efficient, timely traversal and analysis of rule violations across the network to allow quick, efficient identification of the underlying cause or condition of the rule violation.

18 Claims, 7 Drawing Sheets

IT POLICY VIOLATION VIEWS

BACKGROUND

In a managed information environment, a network fabric, or infrastructure, interconnects network elements, or nodes, for providing various services to end users that are also connected to the network. In a managed information network, for example, a number of storage arrays are adapted to provide data storage and retrieval services. The storage arrays connect to other elements such as switches and hosts to efficiently provide the services to the users. Further, each storage array includes a set of individual storage devices (e.g. disk drives) that are themselves considered network elements, or entities. The collection of elements defines a configuration of the information network that is often updated to respond to changes in the network, such as for performance improvements, message traffic redirection, and equipment failures.

In a typical information network, the number of interconnected elements can become large, resulting in a substantial number of relationships between the network elements (nodes), the network connections between them, and the applications that execute on them. Accordingly, a set of rules may be implemented to identify good or mandatory practices in the network, such as providing a redundant link between critical nodes, or always deploying application A on a node with application B, for example. This set of rules defines a policy that policy officers enforce to maintain the network in a predictable and manageable state. However, identifying and verifying each of the rules across the network may become cumbersome in a large IT environment. Further, the policy including the rules may be driven by external factors, such as corporate directives, security requirements, industry best practices, and Federal compliance laws. Therefore, at any particular site or enterprise, there may be multiple policies to satisfy, each having a plurality of rules in effect.

In the managed information network, therefore, multiple policies proscribing or requiring network practices may be imposed. These policies specify various configuration guidelines, such as requirements for connections between nodes (hosts), application dependencies for services provided by the nodes, and configurations of individual nodes. Each policy includes a plurality of rules that identifies network elements, or objects (hosts, services, or connections), a scope of the rule identifying which network objects it applies to, and a condition to test for satisfaction of the rule.

SUMMARY

A managed information environment provides various data services to users. Often such services rely on efficient transport of large amounts of data through a network. Typically, the managed information network supports many users who, in effect, compete for the available network resources. Accordingly, network operators such as employers, corporations, and universities, for example, establish network policies (policies) to codify guidelines, or rules, that define optimal practices to ensure a fair, efficient and productive distribution of network resources to the users.

In a large network, it can be difficult to pinpoint and track down the causes of rule violations deviating from established policies. Network event and monitoring systems generate a multitude of notifications about occurrences and changes in the network, Conventional environment monitoring mechanisms, however, do not categorize notifications according to those triggering rule violations, and do not identify related network entities and rules. A rule violation processor, disclosed further belolw, allows traversal of notifications according to rule violations, organizes the violation according to severity and recurrence, and identifies related rules and network entities which may be related to the rule violation. The resulting graphical user interface provides efficient, timely traversal and analysis of rule violations across the network to allow quick, efficient identification of the underlying cause or condition of the rule violation.

To ensure compliance with the policy or policies in effect for a given network environment (network), the rules of the policy are periodically evaluated. A discovery process or other suitable mechanism traverses the network to gather configuration data pertaining to the general state of the network. The configuration data includes notifications of changes, alerts, and conditions in the network that are pertinent to the health of the network. A violation processor evaluates the configuration data against the rules to identify violations of the rules. Therefore, the violation processor identifies rule violations (violations) across the network to be addressed and corrected for compliance with the policies in effect in the network.

The violation processor is responsive to a GUI for traversing the violations by an operator to evaluate the rule violation and identify network conditions contributing to each of the violations. Often, a condition underlying a violation contributes to or causes other violations in related network entities. An operator evaluating the violations may employ the GUI to traverse the violations, identify related objects and rules, and drill down into the network conditions resulting in the rule violation to determine the underlying cause. The GUI therefore provides GUI for efficient traversal of violations to pinpoint conditions causing the violations and provide a remedy.

In an example configuration, a configuration management database (CMDB) provides a repository to store the configuration data. A passive probe mechanism populates the configuration management database (CMDB) with data concerning network health. A near real time gathering daemon maintains the CMDB in a current state. A policy manager identifies policies in force and the rules included in each, and a violation processor evaluates each rule against the network health data in the CMDB. A rule engine evaluates queries from a user, and displays results in a graphical user interface (GUI) operable to display compliance with each policy and with individual rules in each policy. A graphical user interface (GUI) invokes a set of violation views that provides an overview of policy compliance and violations thereof, and computes related objects and violations to allow dill-down queries to interrogate underlying causes and conditions of specific rule violations.

In further detail the method of querying policy violations disclosed herein includes populating a repository of notifications, in which the notifications pertain to adherence to a desired state in an information network, and identifying, for each notification, a rule defining the desired state that the notification pertains to. A GUI presents a display of the notifications, the display including the identified rule and a network entity, such as a switch or host, that triggered the notification, and computing related notifications, such that the related notifications pertain to network entities and other rules corresponding to the identified rule that was triggered. The GUI further provides filtering the display to remove notifications not pertinent to a particular notification under analysis to narrow the notifications and drill down to the underlying cause.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In a network environment, adherence to an established policy facilitates efficient and fair distribution of resources to all users of the network. Similarly, deviation from the established policies can cause slowdown, bottlenecks, and outright failures or other circumstances leading to reduced or interrupted provision of services to some or all users of the networks. Further, in a large network, it can be difficult to pinpoint and track down the causes of rule violations deviating from established policies. Accordingly, configurations herein are based, in part, on the observation that identifying problematic notifications triggering rule violations can be difficult in a large network environment where many notifications pertaining to both malignant and benign occurrences are collected.

Unfortunately, conventional environment monitoring mechanisms do not categorize notifications according to those triggering rule violations, and do not identify related network entities and rules which may also be related. Accordingly, configurations herein substantially overcome such shortcomings by allowing traversal of notifications according to rule violations, organizing the violations according to severity and recurrence, and identifying other rules and network entities which may be related to the triggering rule violation. In this manner, configurations herein provide a graphical user interface for efficient, timely traversal and analysis of rule violations across the network to allow quick, efficient identification of the underlying cause or condition of the rule violation.

Figure 1:
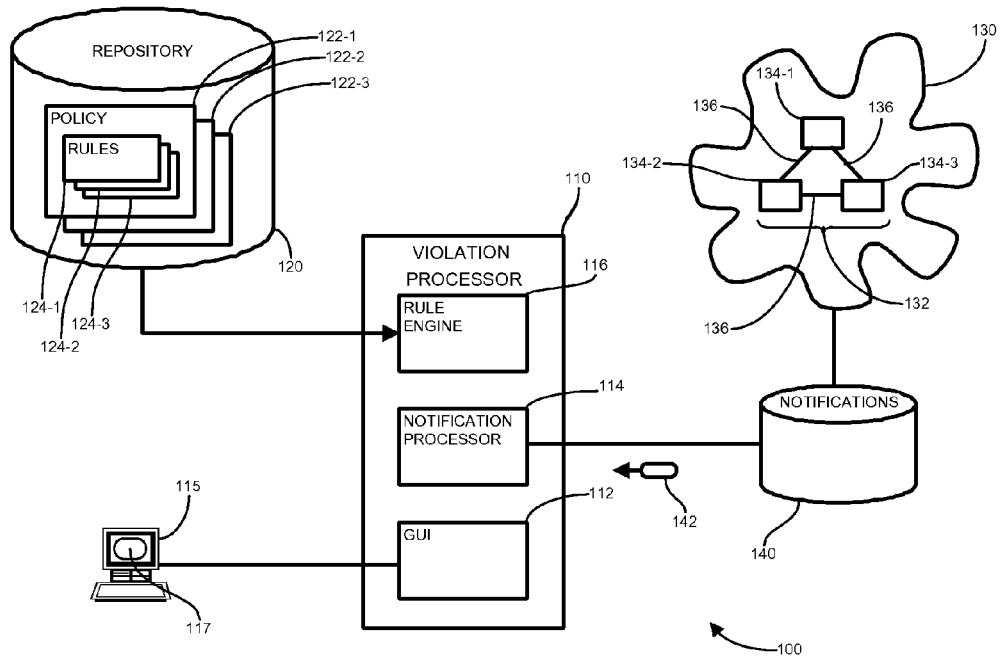
FIG. 1 is a context diagram of a managed information network environment suitable for use with the present invention.

FIG. 1 is a context diagram of a managed information network environment suitable for use with the present invention. Referring to FIG. 1, the managed information environment 100 includes a violation processor 110, a policy repository 120, a network 130 and a notification base 140. The network 130 includes a plurality of network objects 134-1 . . . 134-3 (134 generally), such as storage arrays, hosts and switches, coupled by network interconnections 136. The network interconnections 136 define physical and logical links, discussed below, and collectively comprise network entities 132 (entities) along with the network objects 134. The network objects 134 include nodes operable to generate the notifications, such as hosts, switches, and arrays, and the network entities 132 further include other items in the network 130 operable to exhibit state and/or attributes, such as a physical or logical connection. The violation processor 110 includes a notification processor 114 for receiving notifications 142 from the network entities 134 via the notification base 140, and identifying related notifications 142 and objects 134 in conjunction with the rule engine 116. The notification base 140 is periodically refreshed and updated from the network entities 132 to maintain a current history of notifications 142. The policy repository 120 accumulates policies 122-1 . . . 122-3 (122 generally) and the included rules 124-1 . . . 124-3 (124 generally) within each policy 122 for evaluation. The notification base 140 accumulates notifications 142 generated by the various network entities 134 on the network 130. A rule engine 116 evaluates the notifications 142 against the rules 124 in the policies 122 stored in the policy repository 120, and couples to the GUI 112 for interactive queries and commands via a user console 115.

Figure 2:
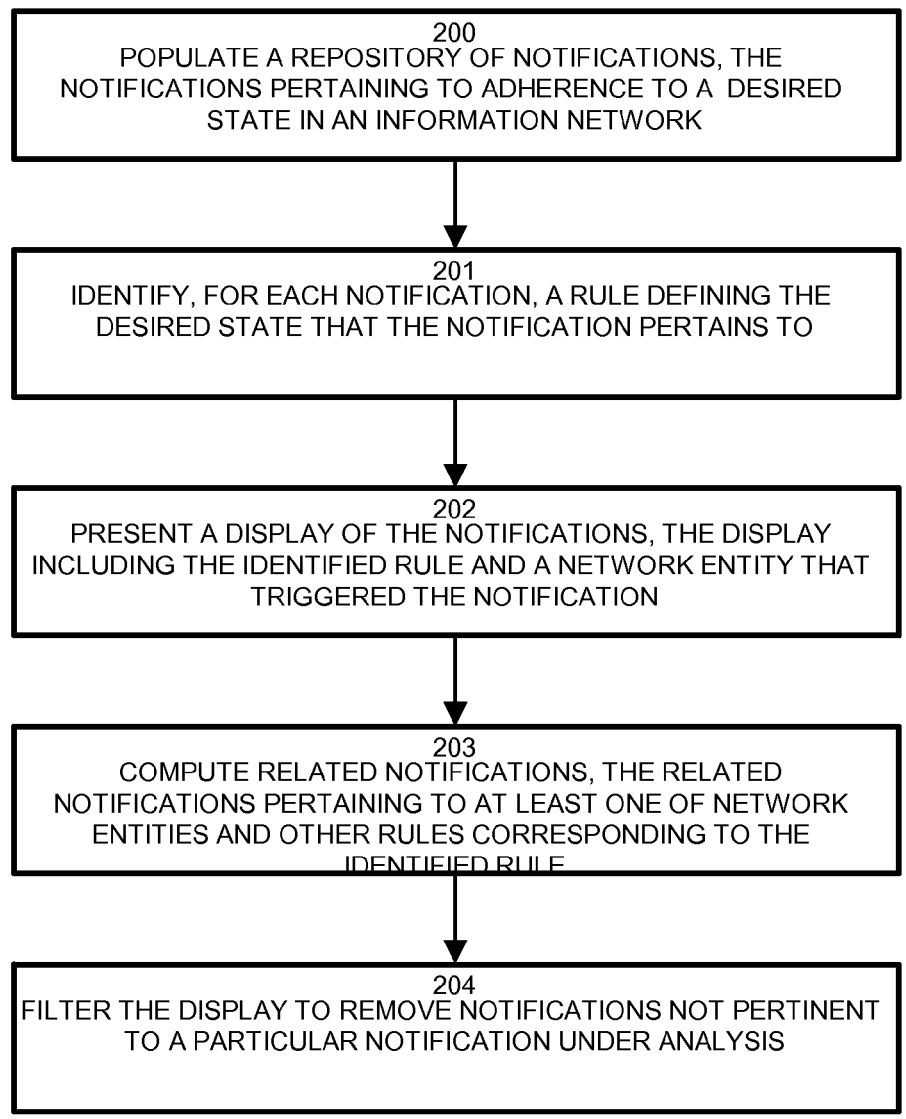
FIG. 2 is a flowchart of violation processing in the environment of FIG. 1.

FIG. 2 is a flowchart of violation processing in the environment of FIG. 1. Referring to FIGS. 1 and 2, the disclosed method of querying policy violations includes, at step 200, populating a repository of notifications, in which the notifications pertain to adherence to a desired state in an information network. The repository 120 may be derived from the CMDB discussed above, or other suitable mechanism. The notification processor 114 invokes the rule engine 116 to identify, for each notification 142, a rule 124 defining the desired state that the notification 142 pertains to, as shown at step 201. The graphical user interface (GUI) 112 presents a display 117 of the notifications 142, such that the display 117 includes the identified rule 124 and a network entity 132 that triggered the notification, as depicted at step 202. As indicated above, a condition triggering a particular notification 142 may be pertinent to, or the cause of, other notifications. Often, identifying these related notifications assists in identifying the underlying condition, cause or malfunction. The notification processor 114 then computes any related notifications 142, such that the related notifications pertain to at least one of network entities 132 and other rules 124-N corresponding to the identified rule 124, as disclosed at step 203.

The scope of each rule 124 indicates other entities 132 or objects 134 considered in evaluating the compliance or deviation of each rule, and therefore may be indicative of the underlying condition. Similarly, certain rules 124 exhibit correspondence or correlation to other rules, such as rules pertaining to each terminus of a particular link—if the link fails, both rules may be triggered. The GUI 112 is then operable to interactively filter the display to remove notifications 142 not pertinent to a particular notification under analysis, as shown at step 204. The GUI 112 allows attribute selection (filtering) of displayed notifications 142 by pull down menus, discussed further below.

Figure 3:
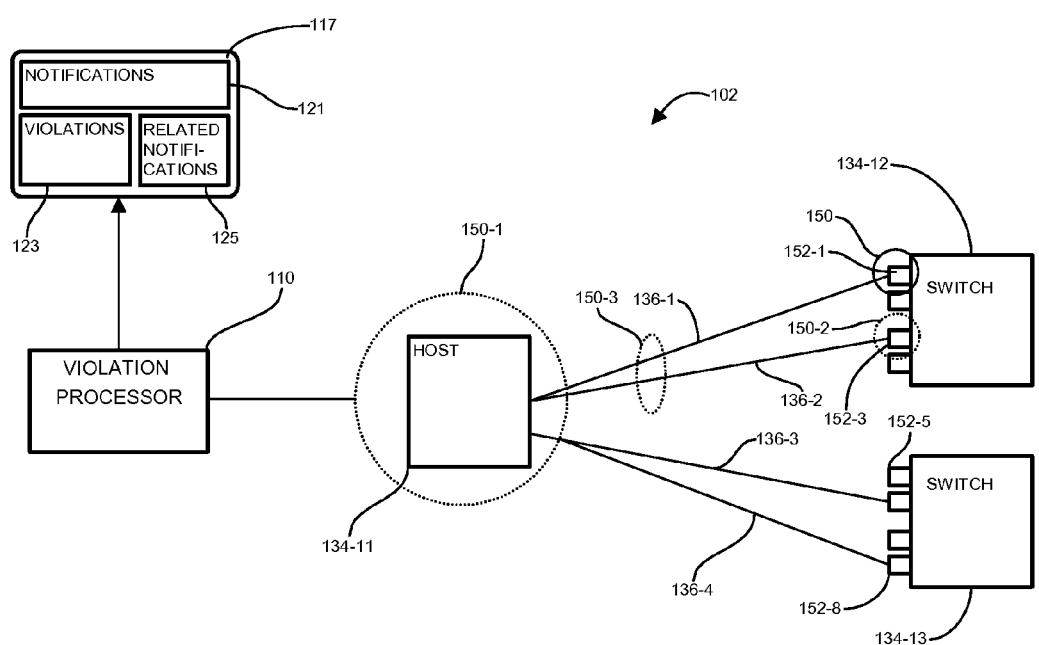
FIG. 3 is a block diagram of traversal and analysis of notifications pertaining to network entities triggering violations.

FIG. 3 is a block diagram of traversal and analysis of notifications pertaining to network entities triggering violations. Referring to FIGS. 1 and 3, an example fragment 102 of the network 130 has network objects 134 including a host 134-11 coupled to switches 134-12 and 134-13. The host 134-11 is connected to switch 134-12 by connections 136-1 and 136-2, and to switch 134-13 by connections 136-3 and 136-4. Each of the switches 134-12 and 134-13 has ports 152-1.152-4 and 152-5.152-8, respectively. A rule 124 in effect may require, for example, that a minimum of two physical connections be provided between network objects 134. A problem occurs with port 152-1, shown by solid circle 150. The violation processor 110 receives a notification 142 attesting to the port 152-1 failure, and displays the notification in the notification window 121.

The rule 124 requiring redundancy of at least two physical connections has now been triggered. Since the rule pertains to having at least 2 physical connections, the remaining link 136-2 is a related network entity, since the expected value of 2 or more physical links now achieved an actual value of 1. Since the remaining connection 136-2 terminates in port 152-3, port 152-3 is deemed a related object, shown by dotted circle 150-1 and is subject to additional rules to ensure continued operation. Similarly, since the host 134-11 is the other terminus of both the failed and remaining links 136-1, 136-2, host 134-11 is a related object, shown by dotted line 150-2, and may incur additional rule scrutiny. Since the triggering notification pertains to link 136-1, rules relating to other links, being of the same type of network entity 132, are deemed related rules 124, and the rule engine 116 may reevaluate rules pertaining to links to identify other rules likely to uncover the underlying cause or symptom of the failed port 152-1. Accordingly, rules pertinent to notifications about the links 136-1 and 136-2 may fire, as shown by dotted line 150-3.

Figure 4:
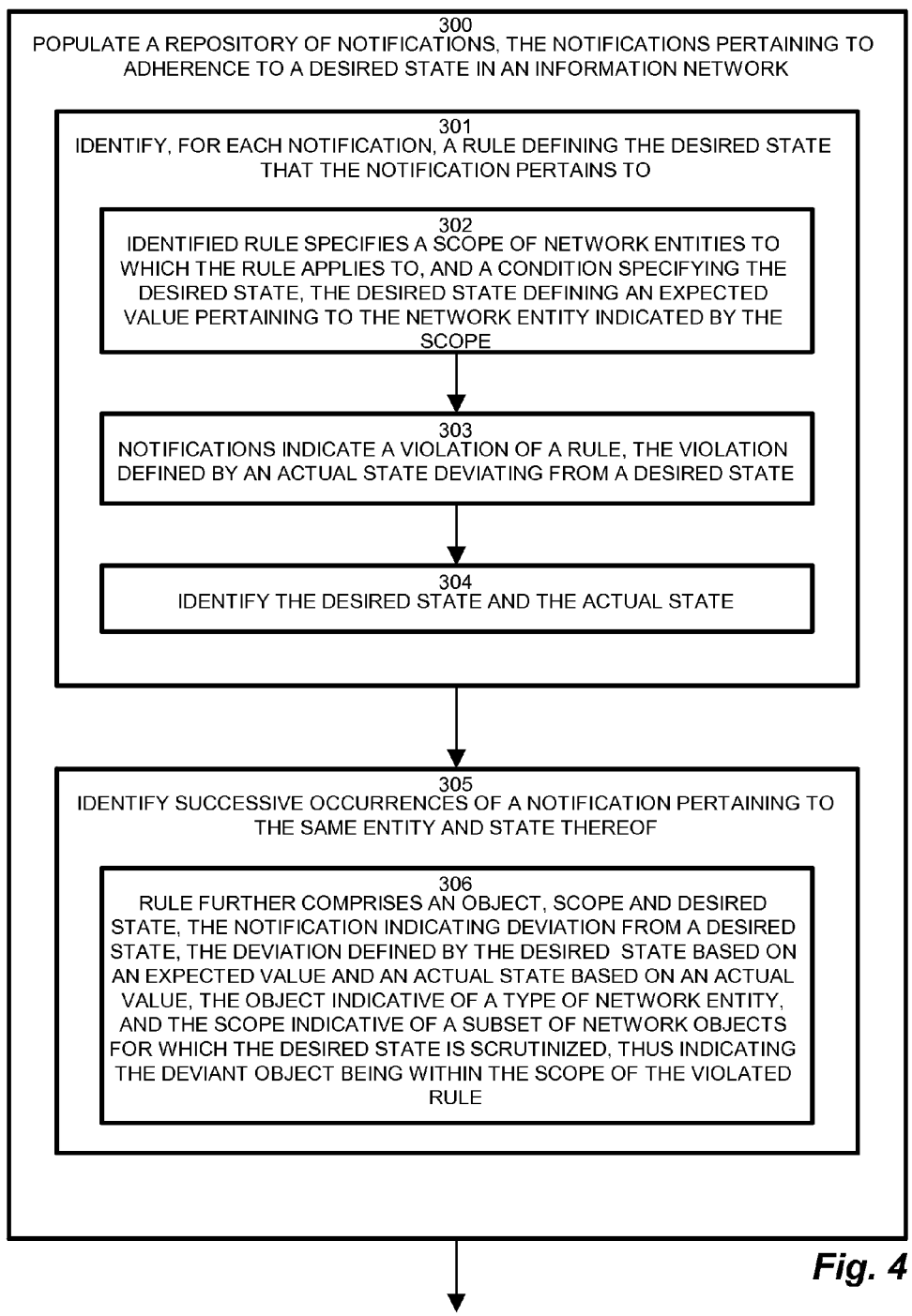
FIGS. 4-6 are a flowchart of violation views in the GUI for traversing and analyzing the violations.
Figure 5:
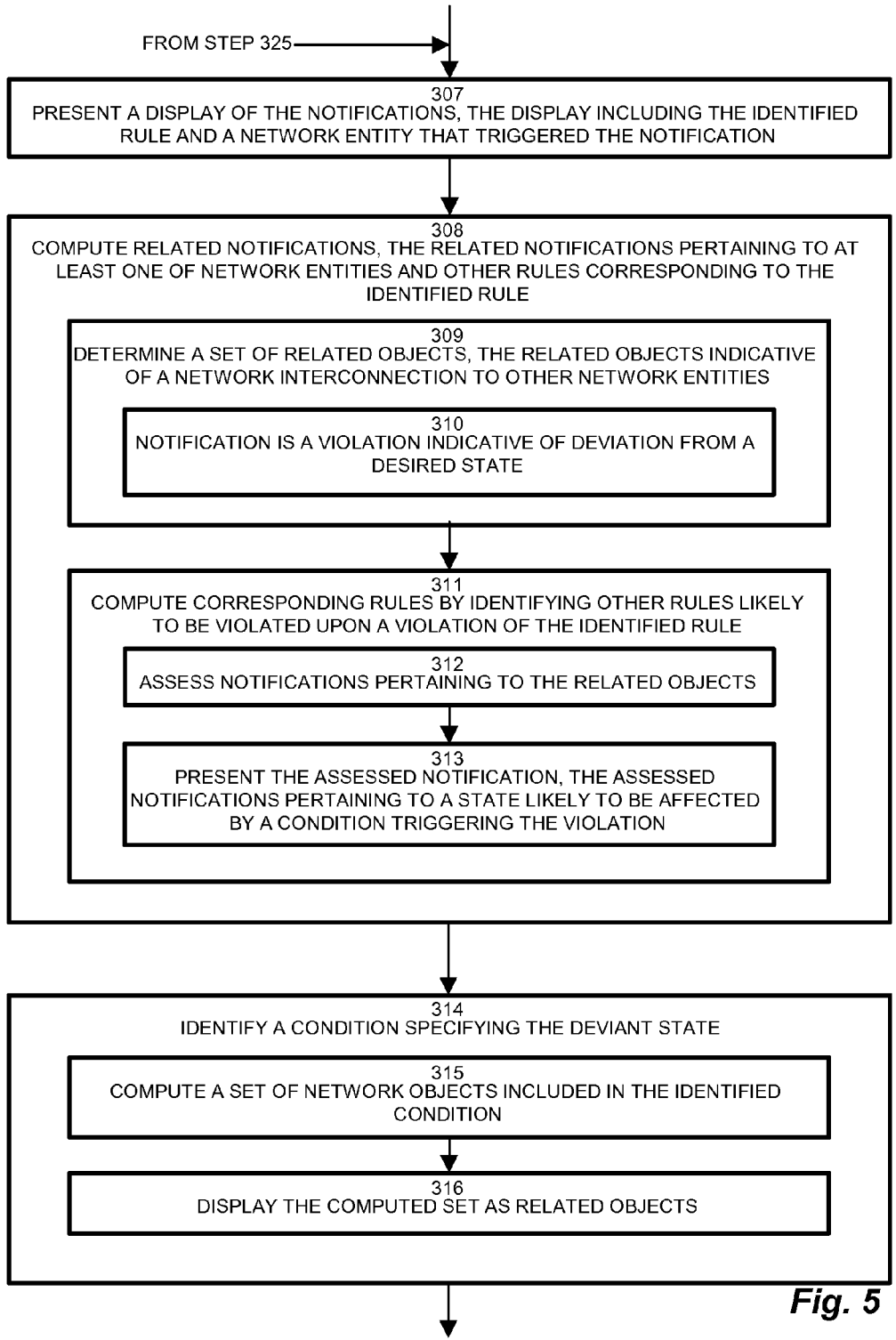
Figure 6:
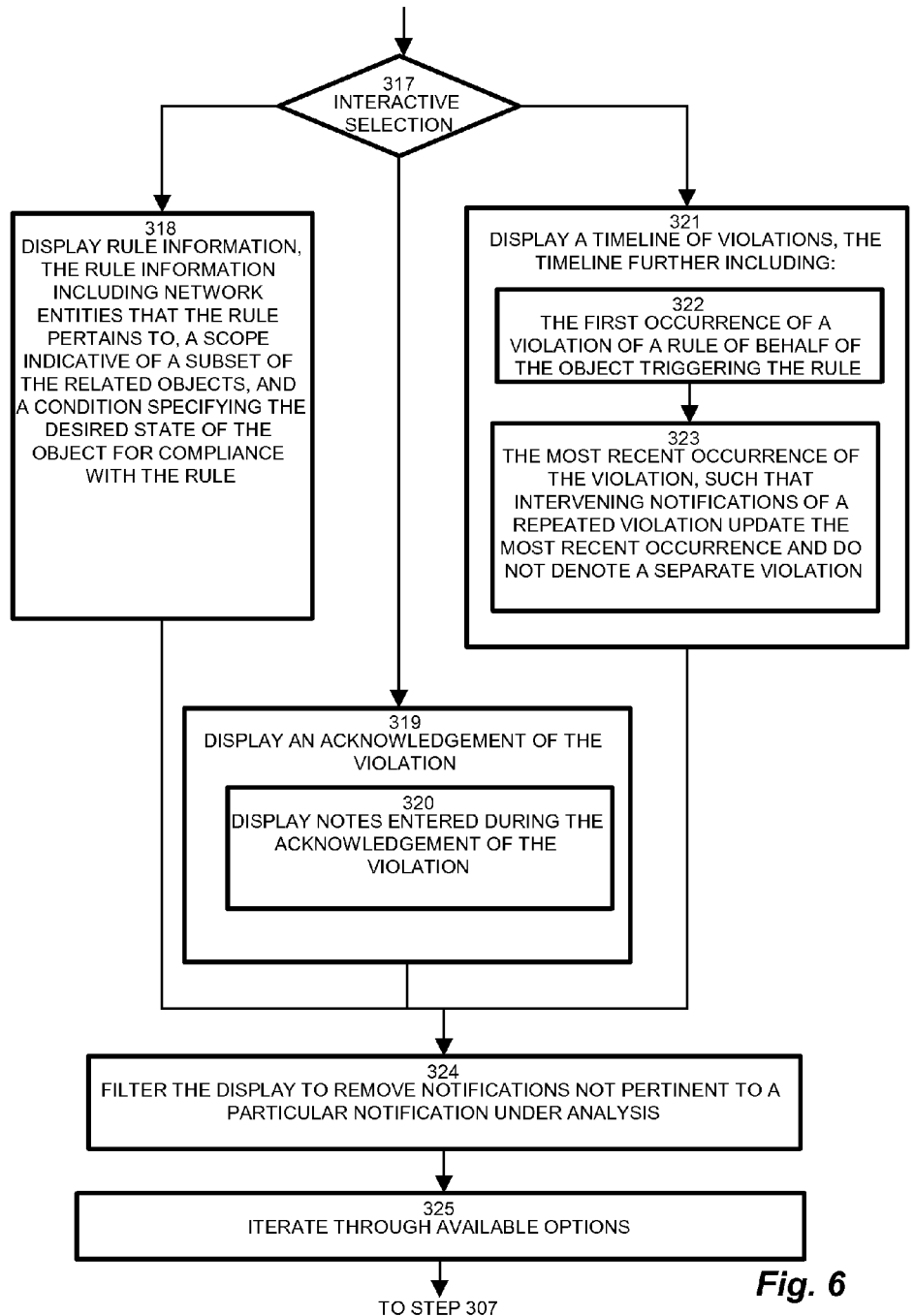

FIGS. 4-6 are a flowchart of violation views in the GUI for traversing and analyzing the violations. Referring to FIGS. 3-6, the method of querying policy violations further includes populating a repository of notifications 142, in which the notifications 142 pertain to adherence to a desired state in an information network 130, as shown at step 300. The notification processor 114 is responsive to the stream of notifications 142 to identify, for each notification 142, a rule defining the desired state that the notification pertains to, as depicted at step 301. Each rule 142 defines a scope of applicability, such that the identified rule specifies a scope of network entities 132 to which the rule 124 applies to, and a condition specifying the desired state, in which the desired state defines an expected value pertaining to the network entity 132 indicated by the scope, as shown at step 302.

The notification processor 114 identifies notifications that indicate a violation of a rule 124, in which the violation is defined by an actual state deviating from a desired state, disclosed at step 303. The rule engine 116 identifies the desired state and, the actual state, as disclosed at step 304, thus enumerating a value that the triggering attribute of the entity is expected to be. Further, as a rule deviant state persists, corresponding notifications 142 tend to accumulate. Accordingly, populating the repository 140 includes identifying successive occurrences of a notification 142 pertaining to the same entity 132 and state thereof, as disclosed at step 305. Each of the rules triggered by a notified condition include an object, scope and desired state, such that the notification indicates deviation from a desired state, the deviation defined by the desired state based on an expected value and an actual state based on an actual value, in which the object is indicative of a type of network entity, and the scope indicative of a subset of network objects 134 for which the desired state is scrutinized, thus indicating the deviant object being within the scope of the violated rule, as disclosed at step 306. Therefore, the notification processor 114 concludes that the entity issuing (triggering) the notification is an entity 132 included in the scope to which the rule applies, such as "all servers in Hopkinton," or "all machines running Oracle® 7.0," for example. Triggering of the same rule for the same condition updates a most recent occurrence for the rule, as well as maintaining a first occurrence, avoiding a recurring condition from triggering a stream of redundant notifications.

The GUI 112 presents a display of the notifications 142 in the notifications window 121, depicted at step 307, such that the display 117 further includes the identified rule 124 and a network entity 132 that triggered the notification 142 in the violation window 123. The notification processor 114 computes related notifications 142, such that the related notifications 142 pertain to at least one of network entities 132 and other rules 124 corresponding to the identified rule, as shown at step 308. This includes, at step 309, determining a set of related objects 134, in which the related objects are indicative of a network interconnection 136 to other network entities 132. Such notifications depict a violation indicative of deviation from a desired state, as shown at step 310.

The notification processor 114 computes corresponding rules 124 by identifying other rules likely to be violated upon a violation of the identified rule 124, as disclosed at step 311. The notification processor 114 assesses notifications 142 pertaining to the related objects 134 from step 309, and presenting the assessed notification 142 in the related notifications window 125, such that the assessed notifications 142 pertain to a state likely to be affected by a condition triggering the violation, as depicted at step 313.

From the identified rule 124 of step 308, the notification processor 114 identifies a condition specifying the deviant state (i.e. the condition from the identified rule 124), as disclosed at step 314, and computes a set of network objects 134 included in the identified condition, as shown at step 315. Having determined the condition to represent a current violation, the same condition is scrutinized with respect to other objects which may exhibit the same condition. The GUI 112 displays the computed set as related objects 134, as disclosed at step 316.

Navigation of the related notifications 142 and related objects 134 allows an operator to quickly and efficiently traverse related violations to pinpoint the condition or circumstances underlying a network inefficiency or malfunction. The display 117 includes several selection options displayable in the violations window 123 via operator selection such as tabs or pulldowns. Accordingly, the GUI 112 presents an interactive selection, at step 317, of rule information 123-1, violation acknowledgement 123-2, and a timeline of notifications 123-3, shown in further detail below in FIG. 8.

A rule information 123-1 selection at step 317 displays rule information, in which the rule information include network entities that the rule pertains to, a scope indicative of a subset of the related objects 134, and a condition specifying the desired state of the object 134 for compliance with the rule, as depicted at step 318. As indicated above, the scope of the rule indicates other entities 132 evaluated by the same rule, and the condition indicates the state or value expected for normal (rule compliant) operation.

An acknowledgement 123-2 selection at step 317 presents an acknowledgement attribute and a notes field. The acknowledgement attribute is an operator settable value that indicates recognition by an operator, and allows subsequent queries to key off this field such that unacknowledged notifications may be distinguished. Accordingly, presenting a display of the notifications 142 further includes displaying an acknowledgement of the violation, as disclosed at step 319, and displaying notes entered during the acknowledgement of the violation, as depicted at step 320. A notes entry attaches specific text to the violation such that subsequent queries of the same or related violations also displays the note.

A timeline selection 123-3 from step 317 presents a display of the notifications further including displaying a timeline of the violations to refine the time scope of recurring violations, as shown at step 321. The violations window 123 displays the first occurrence of a violation of a rule on behalf of the object triggering the rule, as depicted at step 322, and also shows the most recent occurrence of the violation, such that intervening notifications of a repeated violation update the most recent occurrence and do not denote a separate violation, as shown at step 323. Therefore, a recurring problem triggering a string of violations 142 need only display the first and most recent in a series, so as not to overburden the operator with redundant occurrences.

Any of the violation views 123 allow filtering the notifications display 121 to remove notifications not pertinent to a particular notification under analysis, as shown at step 324. Filtering, in the example arrangement, employs pull-down selections for state, priority, policy 122, rule 124, affected item or object 134, age (how long ago) and last changed (i.e. most recent occurrence), shown below in FIG. 8.

The interactive selection and drill-down operations afforded by the violation views 123 are repeatable to traverse different related violations, thus allowing iteration through available options from step 317, as depicted at step 325.

Figure 7:
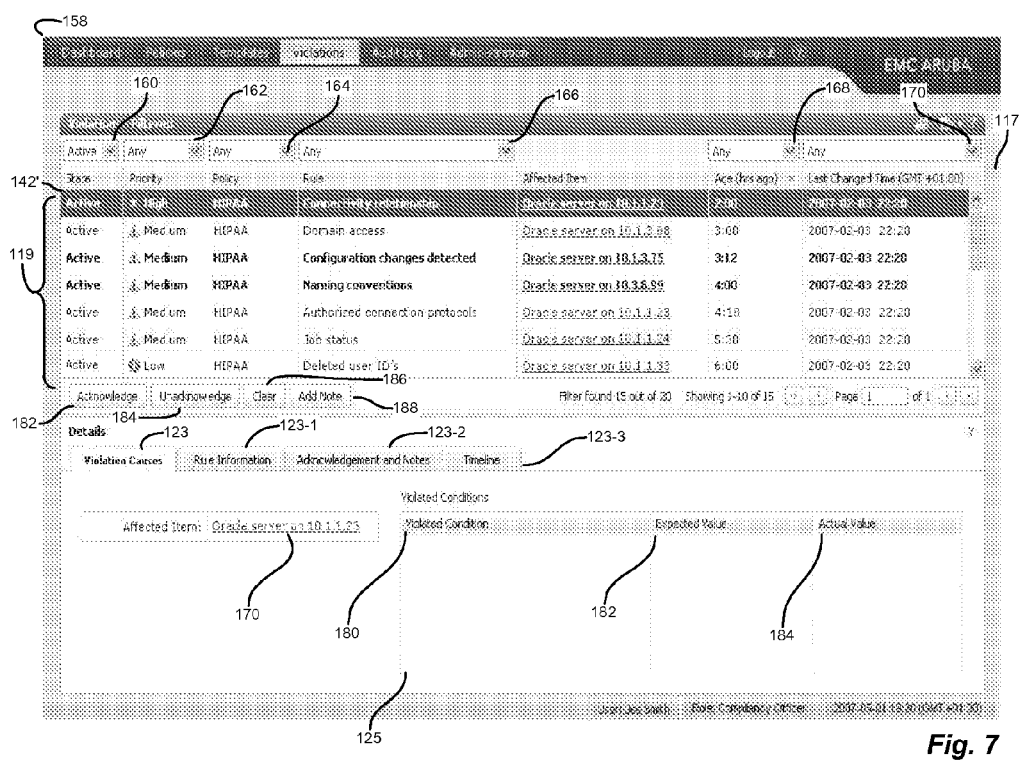
FIG. 7 shows violation views rendered by the GUI in the sequence outlined in FIGS. 4-6.

FIG. 7 depicts the violation views 123 rendered by the GUI in the sequence outlined in FIGS. 4-6. Referring to FIGS. 3 and 7, a violations view 158 presents the display 117 for navigating the violations. The violations window 117 presents line items 119 of received notifications 142. The violation line items 119 are filterable on respective attributes using pulldowns 160-170. A state pulldown 160 allows filtering on cleared or all notifications 119. A cleared notification is either no longer recurring or has been cleared by a user authorized to do so. An unprivileged user cannot clear a violation (in contrast to the acknowledge field, which is operator settable). A priority pulldown 162 allows filtering based on the priority of the violation 119, such as high, medium and low. The priority is an attributed of the respective rule, and is defined when the policy and rule are created. A rule filter pulldown 166 pinpoints a specific rule, and limits the displayed notifications (violations) 119 accordingly. An age pulldown 168 limits according to a particular initial occurrence, and the last changed time pulldown 170 refers to the most recent occurrence for a recurring notification, as described above with respect to the timeline tab 123-3. From the filtered notifications 119, a selected violation 142' may be traversed using the detail tabs 123 . . . 123-3, shown as highlighted bar (142').

The violations window 123 lists the network object 170 causing the particular selected violation 142', and employs additional tabs 123-1 . . . 123-3 to drill down and evaluate/identify the underlying condition and related notifications. The violated conditions 180 display the condition that existed the affected item triggering the rule 142, along with the expected value 182 (compliant value) and the actual value 184 triggering the violation. For example, as shown above, the number of redundant physical connections set by the rule was a value of 2; the switch 132-12 was deemed non-compliant when the port 150-1 failure brought the number of physical connection down to 1. The remaining tabs 123-1 . . . 123-3 are selectable in step 317, as described above.

The violation view 158 also has buttons for manipulating the selected violation 142'. The acknowledge button allows operator acknowledgment of an event, and is reflected on the acknowledgment tab 123-2. An unacknowledged button 184 reverses the acknowledge status, in the case of a recurring problem or erroneous acknowledgment. A clear button allows manual clearing of a violation by an operator with sufficient privileges; a notification may also clear automatically upon non-recurrence. An add note button allows a note to be added to a violation to clarify or refine the status or problem, and is subsequently queryable via tab 123-2.

Those skilled in the art should readily appreciate that the programs and methods for investigating policy violations as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example as in an electronic network such as the Internet or telephone modem lines. Such delivery may be in the form of a computer program product having a computer readable storage medium operable to store computer program logic embodied in computer program code encoded thereon, for example. The operations and methods may be implemented in a software executable object or as a set of instructions embedded in an addressable memory element. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for investigating policy violations has been particularly shown and described with references to embodiments thereof, it will be understood by those skilled in the art that various changes in form and details may be made therein without departing from the scope of the invention encompassed by the appended claims.

What is claimed is:

1. A computer-implemented method of querying policy violations that, when executed by a processor, causes the computer to perform the steps of:

populating a repository with a plurality of notifications, each notification of the plurality of notifications pertaining to adherence to a respective desired state in an information network;

identifying, for each respective notification, a rule defining the respective desired state that the respective notification pertains to, wherein the rule further comprises an object, scope and desired state, the notification indicating deviation from a desired state, the deviation defined by the desired state based on an expected value actual state based on an actual value, the object indicative of a type of network entity, and the scope indicative of a subset of network objects for which the desired state is scrutinized, thus indicating an object being within the scope of the rule;

presenting a display of each respective notification, the display including, for each respective notification, the identified rule and a network entity that triggered the notification;

receiving a selection of a one of the plurality of notifications;

computing related notifications of the plurality of notification relating to the selected notification, wherein the related notifications are related to the selected notification with respect to at least one of the network entity that triggered the selected notification and rules relating to the identified rule for the selected notification; and filtering the display to remove from the display notifications of the plurality of notifications not related to the selected notification.

2. The method of claim 1 wherein the notifications indicate a violation of a rule, the violation defined by an actual state deviating from a desired state.

3. The method of claim 2 wherein the identified rule specifies a scope of network entities to which the rule applies to, and a condition specifying the desired state, the desired state defining an expected value pertaining to the network entity indicated by the scope.

4. The method of claim 1 wherein the notification is a violation indicative of deviation from a desired state, computing the related notifications further comprising:

identifying the desired state and the actual state:

determining a set of related objects, the related objects indicative of a network interconnection to other network entities;

assessing notifications pertaining to the related objects; and presenting the assessed notification, the assessed notifications pertaining to a state likely to be affected by a condition triggering the violation.

5. The method of claim 4 wherein computing the related notifications further comprises:

computing corresponding rules by identifying other rules likely to be violated upon a violation of the identified rule.

6. The method of claim 4 wherein presenting a display of the notifications further comprises:

identifying a condition specifying the deviant state;

computing a set of network objects included in the identified condition; and displaying the computed set as related objects.

7. The method of claim 4 wherein presenting a display of the notifications further comprises displaying rule information, the rule information including network entities that the rule pertains to, a scope indicative of a subset of the related objects, and a condition specifying the desired state of the object for compliance with the rule.

8. The method of claim 7 wherein presenting a display of the notifications further comprises:

displaying an acknowledgement of the violation; and displaying notes entered during the acknowledgement of the violation.

9. The method of claim 7 wherein presenting a display of the notifications further comprises displaying a timeline of violations, the timeline further including:

the first occurrence of a violation of a rule on behalf of the object triggering the rule; and the most recent occurrence of the violation, such that intervening notifications of a repeated violation update the most recent occurrence and do not denote a separate violation.

10. The method of claim 3 wherein populating the repository includes identifying successive occurrences of a notification pertaining to the same entity and state thereof.

11. A violation processor device for querying network policy violations comprising:

a repository for receiving and storing a plurality notifications, each notification of the plurality of notifications pertaining to adherence to a respective desired state in an information network;

a rule engine for identifying, for each respective notification, a rule defining the respective desired state that the respective notification pertains to, wherein the rule further comprises an object, scope and desired state, the notification indicating deviation from a desired state, the deviation defined by the desired state based on an expected value and an actual state based on an actual value, the object indicative of a type of network entity, and the scope indicative of a subset of network objects for which the desired state is scrutinized, thus indicating an object being within the scope of the rule;

a graphical user interface (GUI) for presenting a display of each respective notification, the display having violation views including, for each respective notification, the identified rule and a network entity that triggered the notification and for receiving a selection of a one of the plurality of notifications; and a notification processor for computing related notifications of the plurality of notification relating to the selected notification wherein the related notifications are related to the selected notification with respect to at least one of the network entity that triggered the selected notification and rules relating to the identified rule for the selected notification and for filtering the display to remove from the display on the GUI notifications of the plurality of notifications not related to the selected notification.

12. The device of claim 11 wherein the rule engine is operable to determine when the notifications indicate a violation of a rule, the violation defined by an actual state deviating from a desired state.

13. The device of claim 11 wherein the rule engine identifies the notification as a violation indicative of deviation from a desired state, the notification processor responsive to the rule engine for:

identifying the desired state and the actual state:

determining a set of related objects, the related objects indicative of a network interconnection to other network entities;

computing corresponding rules by identifying other rules likely to be violated upon a violation of the identified rule;

assessing notifications pertaining to the related objects; and presenting the assessed notification, the assessed notifications pertaining to a state likely to be affected by a condition triggering the violation.

14. The device of claim 13 wherein presenting a display of the notifications further comprises identifying a condition specifying the deviant state;

computing a set of network objects included in the identified condition; and displaying the computed set as related objects.

15. The device of claim 11 wherein presenting a display of the notifications further comprises displaying rule information, the rule information including network entities that the rule pertains to, a scope indicative of a subset of the related objects, and a condition specifying the desired state of the object for compliance with the rule.

16. The device of claim 11 wherein presenting a display of the notifications further comprises
    displaying an acknowledgement of the violation; and
    displaying notes entered during the acknowledgement of the violation.

17. The device of claim 11 wherein presenting a display of the notifications further comprises displaying a timeline of violations, the timeline further including:
    the first occurrence of a violation of a rule on behalf of the object triggering the rule;
    the most recent occurrence of the violation, such that intervening notifications of a repeated violation update the most recent occurrence and do not denote a separate violation, wherein populating the repository includes identifying successive occurrences of a notification pertaining to the same entity and state thereof.

18. A computer program product having a non-transitory computer readable storage medium operable to store computer program logic embodied in computer program code encoded as a set of processor based instructions thereon for querying policy violations comprising:
    computer program code for populating a repository with a plurality of notifications, each notification of the plurality of notifications pertaining to adherence to a respective desired state in an information network;
    computer program code for identifying, for each respective notification, a rule defining the respective desired state that the respective notification pertains to, wherein the rule further comprises an object, scope and desired state, the notification indicating deviation from a desired state, the deviation defined by the desired state based on an expected valued actual state based on an actual value, the object indicative of a type of network entity, and the scope indicative of a subset of network objects for which the desired state is scrutinized, thus indicating an object being within the scope of the rule;
    computer program code for presenting a display of each respective notification, the display including, for each respective notification, the identified rule and a network entity that triggered the notification;
    computer program code for receiving a selection of a one of the plurality of notifications;
    computer program code for computing related notifications of the plurality of notifications relating to the selected notification, wherein the related notifications are related to the selected notification with respect to at least one of the network entity that triggered the selected notification and rules relating to the identified rule for the selected notification; and
    computer program code for filtering the display to remove from the display notifications of the plurality of notifications not related to the selected notification.

\* \* \* \* \*